US012658390B2

(12) United States Patent
Toda

(10) Patent No.: US 12,658,390 B2
(45) Date of Patent: Jun. 16, 2026

(54) RELAY CONNECTOR APPARATUS

(71) Applicant: Japan Aviation Electronics Industry, Ltd., Tokyo (JP)

(72) Inventor: Kentaro Toda, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 246 days.

(21) Appl. No.: 18/673,825

(22) Filed: May 24, 2024

(65) Prior Publication Data

US 2024/0429009 A1 Dec. 26, 2024

(30) Foreign Application Priority Data

Jun. 26, 2023 (JP) ................................ 2023-104108

(51) Int. Cl.
*H01H 45/02* (2006.01)
*H01H 49/00* (2006.01)

(52) U.S. Cl.
CPC ............ *H01H 45/02* (2013.01); *H01H 49/00* (2013.01)

(58) Field of Classification Search
CPC ........ H01H 45/02; H01H 49/00; H01R 13/40; H01R 13/02; H01R 13/502
See application file for complete search history.

(56) References Cited

U.S. PATENT DOCUMENTS 8,116,083 B2 * 2/2012 Ni ........................ G06K 19/041 361/737
2007/0076387 A1 * 4/2007 Ni .......................... H05K 1/117 361/760

FOREIGN PATENT DOCUMENTS

GB 2331633 A * 5/1999 ......... H01R 12/7076
JP H02273476 A 11/1990
JP 3189118 B2 * 7/2001
JP 2016004650 A * 1/2016

* cited by examiner

*Primary Examiner* — Mohamad A Musleh
(74) *Attorney, Agent, or Firm* — Lippes Mathias LLP

(57) ABSTRACT

A relay connector apparatus includes a housing, a printed circuit board disposed inside the housing, and a spring component for shell connection disposed inside the housing. A connector having a conductive shell is fitted to one side of the housing and a connector having a conductive shell is fitted to another side of the housing, at least an end part of the printed circuit board on the one side includes a contact point to be inserted into the connector, the spring component for shell connection includes a spring contact point that is pushed by the connector and moves in a direction toward the printed circuit board during a fitting operation of the connector.

8 Claims, 14 Drawing Sheets

RELAY CONNECTOR APPARATUS

INCORPORATION BY REFERENCE

This application is based upon and claims the benefit of priority from Japanese patent application No. 2023-104108, filed on Jun. 26, 2023, the disclosure of which is incorporated herein in its entirety by reference.

BACKGROUND

The present disclosure relates to a relay connector apparatus.

Japanese Unexamined Patent Application Publication No. H02-273476 discloses a relay connector apparatus. For example, as shown in FIG. 14, connectors 1 and 2 fitted to both sides of a relay connector apparatus 5, respectively, accommodate a plurality of projecting and recessed contacts in an insulator. Furthermore, the connectors 1 and 2 have fitting parts 14 and 25 in which the plurality of contacts are surrounded by a metal shell. The relay connector apparatus 5 accommodates, in a metal housing 9, a connector part 6 fitted to the connector 1 on the apparatus side, a connector part 7 fitted to the connector 2 on the cable side, and a printed circuit board 8 on which both connector parts are mounted. The printed circuit board 8 includes a filter element 83 for preventing noise components superimposed on signals transmitted between the connector parts 6 and 7.

SUMMARY

In the relay connector apparatus 5 shown in FIG. 14, the connector parts 6 and 7 are attached to both ends of the housing 9, which houses the printed circuit board 8, and the connectors 1 and 2 are fitted to the connector parts 6 and 7, respectively.

However, the connector parts 6 and 7 of the relay connector apparatus 5 are originally commercially-available connectors that can be fitted to the connectors 1 and 2, respectively. Therefore, the use of commercially-available connectors as components of the relay connector apparatus 5 results in high costs. In addition, commercially-available connectors may cause impedance mismatches inside the connector parts 6 and 7. Therefore, the relay connector apparatus 5 shown in FIG. 14 has a problem of deteriorating transmission characteristics in high-speed signal transmission.

An object of the present disclosure is to provide a relay connector apparatus capable of addressing such problem, aiming to suppress an increase in cost and deterioration of transmission characteristics caused by a connector part.

In an aspect of the present disclosure, a relay connector apparatus includes: a housing; a printed circuit board disposed inside the housing; and a spring component for shell connection disposed inside the housing. A first connector having a first conductive shell is fitted to one side of the housing and a second connector having a second conductive shell is fitted to another side of the housing, at least an end part of the printed circuit board on the one side includes a first contact point to be inserted into the first connector, the spring component for shell connection includes a first spring contact point that is pushed by the first connector and moves in a direction toward the printed circuit board during a fitting operation of the first connector, and when the first connector is fitted to the one side of the housing, the first spring contact point is brought into contact with the first conductive shell, so that the first conductive shell and the second conductive shell become conductive.

In the above relay connector apparatus, the spring component for shell connection may include: a cantilever beam type spring piece including a part extending in a direction obliquely intersecting a plate surface of the printed circuit board; and a body part. One end of the spring piece may include a first spring contact point, another end of the spring piece may include a pivot point fixed to the body part, a part between the one end and the other end may include a force point pushed by the first connector in a fitting direction parallel to the plate surface, and during the fitting operation of the first connector, the first connector may push the force point, so that the first spring contact point moves in a direction toward the printed circuit board.

In the above relay connector apparatus, the spring component for shell connection may include: a seesaw type spring piece including a part extending in a direction obliquely intersecting a plate surface of the printed circuit board; and a body part. One end of the spring piece may include a first spring contact point, another end of the spring piece may include a force point pushed by the first connector in a fitting direction parallel to the plate surface, a part between the one end and the other end may include a pivot point fixed to the body part, and during the fitting operation of the first connector, the first connector may push the force point, so that the first spring contact point moves in a direction toward the printed circuit board.

In the above relay connector apparatus, the part of the spring piece including the force point may be bent in a direction orthogonal to the fitting direction.

In the above relay connector apparatus, the spring component for shell connection may be integrally formed by bending a metal plate.

In the above relay connector apparatus, the printed circuit board included in the housing may have components mounted thereon.

In the above relay connector apparatus, an end part of the printed circuit board may have a second contact point to be inserted into the second connector, the spring component for shell connection may have a second spring contact point pushed by the second connector and moves in a direction toward the printed circuit board during the fitting operation of the second connector, and when the second connector is fitted to the other side of the housing, the second spring contact point is brought into contact with the second conductive shell, so that the first conductive shell and the second conductive shell may become conductive.

In the above relay connector apparatus, the first connector may include: the cylindrical first conductive shell protruding from an end surface of a hood to which a harness is connected; and the plug disposed inside the first conductive shell, into which the first contact point is inserted, and the first conductive shell and the second conductive shell may be made of metal.

According to the present disclosure, it is possible to provide a relay connector apparatus capable of suppressing an increase in cost and deterioration of transmission characteristics.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
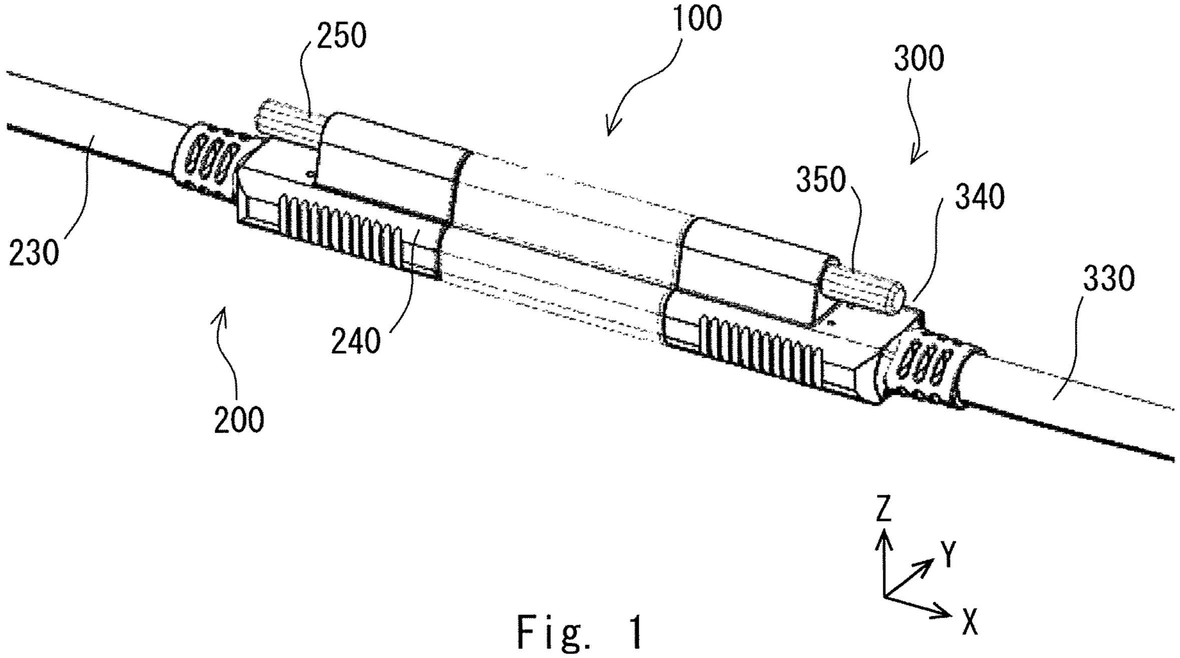
FIG. 1 is a perspective view showing an example of a relay connector apparatus according to a first embodiment and connectors fitted to one side and the other side of the relay connector apparatus, respectively.

A specific configuration according to this embodiment will be described below with reference to the drawings. The following description shows preferred embodiments of the present disclosure, and the scope of the present disclosure is not limited to the following embodiments. In the following description, those bearing the same reference numerals show substantially the same content. Some reference numerals and hatching are omitted in order to avoid cluttering in the drawing.

First Embodiment

Figure 2:
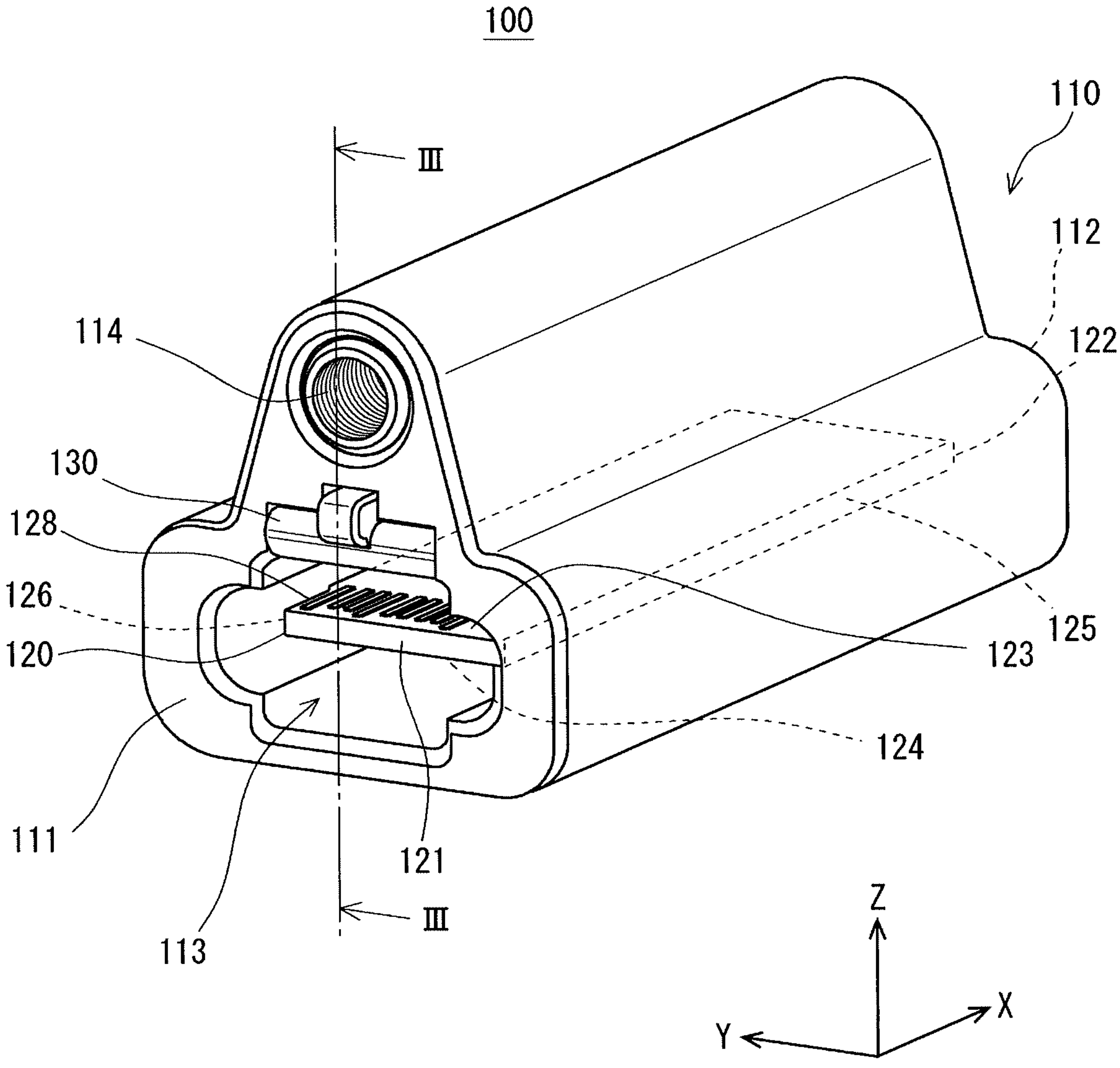
FIG. 2 is a perspective view showing an example of the relay connector apparatus according to the first embodiment.
Figure 3:
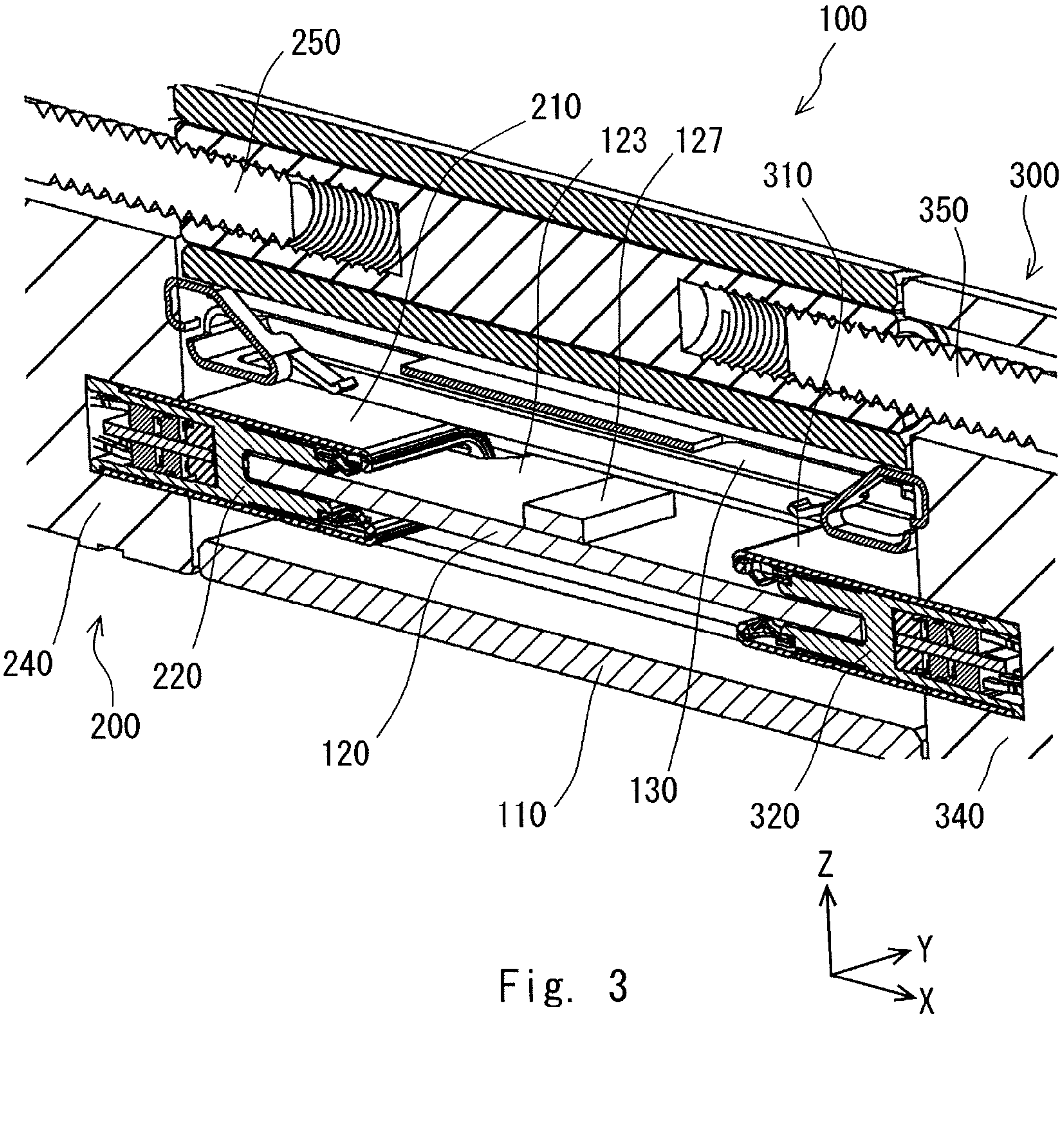
FIG. 3 is a cross-sectional view showing an example of a relay connector apparatus according to the first embodiment, showing a cross-section taken along the line III-III of FIG. 2.

A relay connector apparatus according to a first embodiment will be described below. FIG. 1 is a perspective view showing an example of the relay connector apparatus according to the first embodiment and connectors fitted to one side and the other side of the relay connector apparatus, respectively. FIG. 2 is a perspective view showing an example of the relay connector apparatus according to the first embodiment. FIG. 3 is a cross-sectional view showing an example of the relay connector apparatus according to the first embodiment, and shows a cross-section taken along the line III-III of FIG. 2. As shown in FIGS. 1 to 3, a relay connector apparatus 100 relays a connector 200 and a connector 300.

The connector 200 has a conductive shell 210, a plug 220, a harness 230, and a hood 240. The connector 200 may have a screw 250. The conductive shell 210 is, for example, cylindrical with an oblong cross-section. The conductive shell 210 is not limited to being cylindrical with an oblong cross-section, and instead may be cylindrical with a square cross-section or the like, as long as it can be fitted to the relay connector apparatus 100. The conductive shell 210 is, for example, made of metal. The conductive shell 210 is not limited to being made of metal as long as it is conductive. The conductive shell 210 is connected to, for example, a ground (GND) potential. The conductive shell 210 protrudes from the end surface of the hood 240 to which the harness 230 is connected.

The harness 230 is cord-shaped with a plurality of wires bundled together. The hood 240 is a part to which the conductive shell 210 and the plug 220 for fitting the connector 200 to the relay connector apparatus 100 are attached. The plug 220 is disposed inside the cylindrical conductive shell 210 having an oblong cross-section. As described above, the connector 200 has the cylindrical conductive shell 210 having an oblong cross-section protruding from the end surface of the hood 240 to which the harness 230 is connected, and the plug 220 disposed inside the conductive shell 210. Note that the plug 220 is not limited to being disposed inside the cylindrical conductive shell 210 having an oblong cross-section as long as contact points 128 of the printing plate 120 described later are inserted.

The connector 300 has a conductive shell 310, a plug 320, a harness 330, a hood 340, and a screw 350. The conductive shell 310, the plug 320, the harness 330, the hood 340, and the screw 350 have the same functions as those of the conductive shell 210, the plug 220, the harness 230, the hood 240, and the screw 250, respectively.

The relay connector apparatus 100 includes a housing 110, the printed circuit board 120, and a spring component 130 for shell connection. In FIG. 2, only the outline of the printed circuit board 120 is shown in order to avoid clutter in the drawing. In the relay connector apparatus 100, the connector 200 having the conductive shell 210 is fitted to one side of the housing 110. In addition, in the relay connector apparatus 100, the connector 300 having the conductive shell 310 is fitted to the other side of the housing 110.

The housing 110 is cylindrical and has a through hole 113 penetrating from one end surface 111 to the other end surface 112. The housing 110 may be molded. The housing 110 is, for example, a square cylinder. In this case, the end surfaces 111 and 112 of the housing 110 are square. The corners of the housing 110 may appropriately have a slight rounding, such as corners R. The housing 110 may further include a triangular prismatic part having an end surface provided with a screw hole 114. In this case, the end surface 111 and the end surface 112 have a rectangular shape combined with a triangular shape.

Here, for the convenience of explanation of the relay connector apparatus 100, an XYZ orthogonal coordinate axis system is introduced. For example, the direction orthogonal to the end surface 111 is defined as an X-axis direction, the direction from the end surface 111 to the end surface 112 is defined as an X-axis positive direction, and the direction opposite to the X-axis positive direction is defined as an X-axis negative direction. For example, one side is defined as an X-axis negative direction side, and the other side is defined as an X-axis positive direction side. Two directions perpendicular to the X-axis direction are defined as a Y-axis direction and a Z-axis direction. The Z-axis positive direction is called upward, and the Z-axis negative direction is called downward. The length in the Z-axis direction is called a height or thickness.

The housing 110 has a screw hole 114 on the Z-axis positive direction side of the through hole 113 in the end surface 111 and on the Z-axis positive direction side of the through hole 113 in the end surface 112. The screw 250 protruding from the end surface of the hood 240 on the X-axis positive direction side in the connector 200 is fixed to the screw hole 114 in the end surface 111, and the screw 350 protruding from the end surface of the hood 340 on the X-axis negative direction side in the connector 300 is fixed to the screw hole 114 in the end surface 112. Thus, the connection between the relay connector apparatus 100, the connector 200, and the connector 300 can be strengthened. The housing 110 includes the printed circuit board 120 inside the through hole 113.

The printed circuit board 120 is disposed inside the housing 110. Specifically, the printed circuit board 120 is disposed inside the through hole 113. The printed circuit board 120 is, for example, a rectangular plate. The printed circuit board 120 may be a paddle card. The printed circuit board 120 has an end surface 121 on the X-axis negative direction side, an end surface 122 on the X-axis positive direction side, a plate surface 123 on the Z-axis positive direction side, a plate surface 124 on the Z-axis negative direction side, a side surface 125 on the Y-axis negative direction side, and a side surface 126 on the Y-axis positive direction side. Components 127 such as an IC and a chip resistor are disposed on the plate surface 123. The components 127 may include a repeater IC that amplifies signals reduced by transmission losses. Thus, the printed circuit board 120 included in the housing 110 is equipped with the components 127.

The contact points 128 are provided at end parts of the printed circuit board 120 on the X-axis negative direction side and on the X-axis positive direction side. The contact points 128 may be an edge connector. The contact points 128 are provided at the end parts of the plate surface 123 of the printed circuit board 120 on the X-axis negative direction side and the X-axis positive direction side. The contact points 128 may be provided not only at the end parts of the plate surface 123 but also at the end parts of the plate surface 124 on the X-axis negative direction side and the X-axis positive direction side or may be provided on the end surface 121 and the end surface 122, as long as they are provided at the end parts of the printed circuit board 120 on the X-axis negative direction side and the X-axis positive direction side.

The contact points 128 may be provided only at the end part of the printed circuit board 120 on the X-axis negative direction side or only at the end part on the X-axis positive direction side. In this case, other end parts may have the connector part of Japanese Unexamined Patent Application Publication No. H02-273476. At least one end part of the printed circuit board 120 has the contact points 128. The contact points 128 are members inserted into the connector 200. When the contact points 128 are provided at both ends of the printed circuit board 120, each contact 128 is inserted into the connector 200 and the connector 300. Specifically, the contact points 128 provided at the end part of the printed circuit board 120 on the X-axis negative direction side are inserted into the plug 220 of the connector 200. The contact points 128 provided at the end part of the printed circuit board 120 on the X-axis positive direction side are inserted into the plug 320 of the connector 300.

Figure 4:
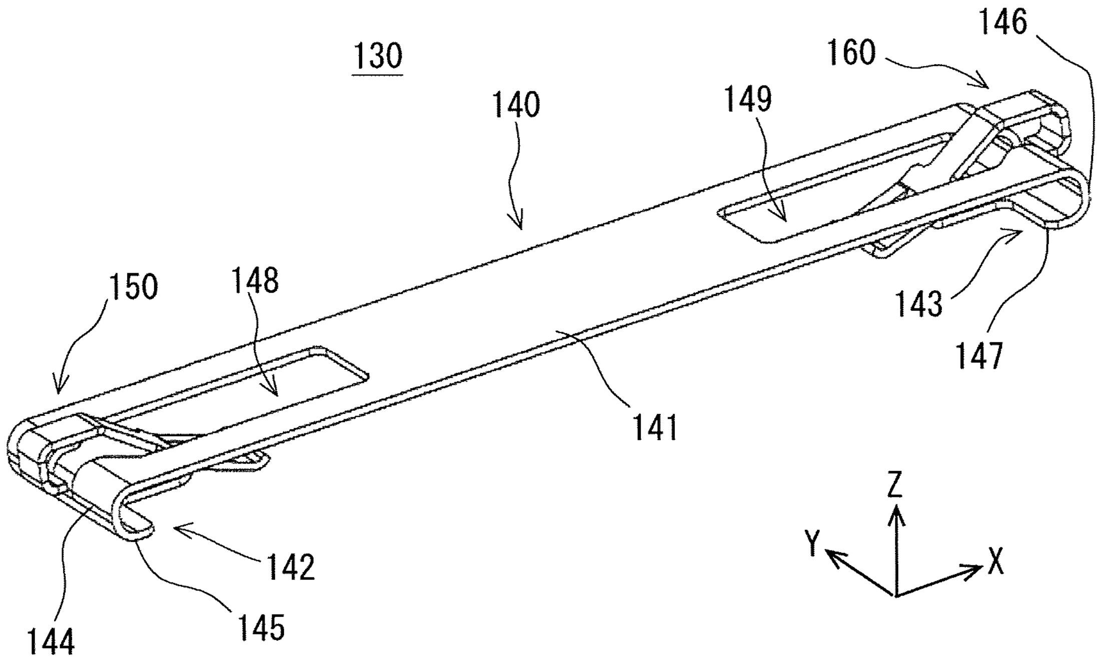
FIG. 4 is a perspective view showing an example of a spring component for shell connection in the relay connector apparatus according to the first embodiment.
Figure 5:
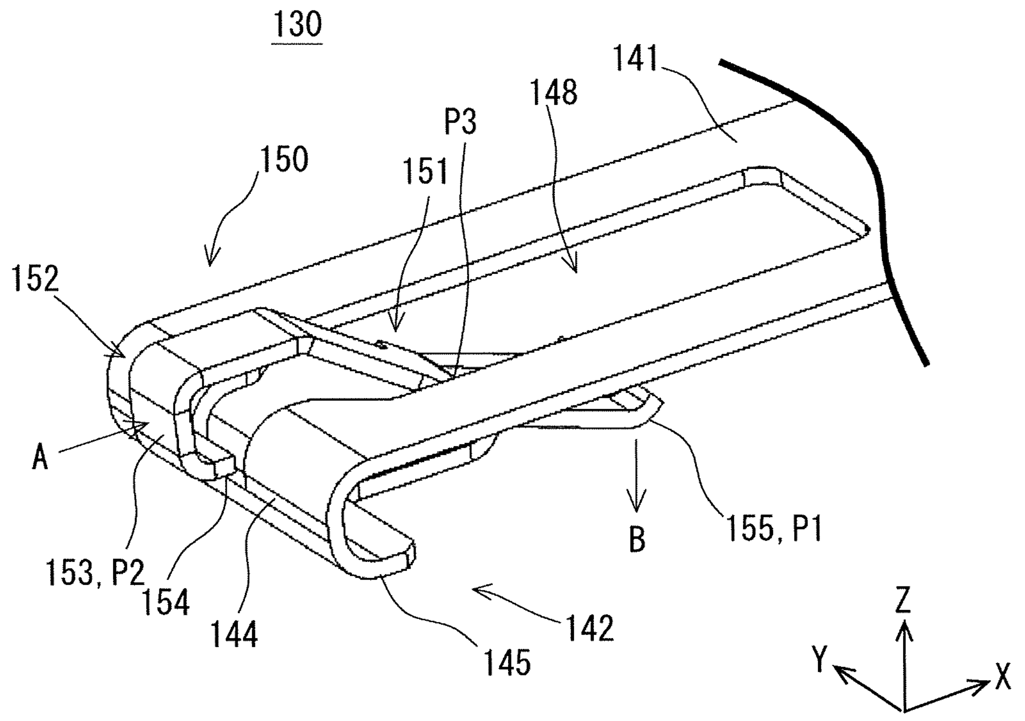
FIG. 5 is an enlarged view showing an example of a part of a spring component for shell connection in the relay connector apparatus according to the first embodiment.

The spring component 130 for shell connection is disposed inside the housing 110. FIG. 4 is a perspective view showing an example of the spring component 130 for shell connection in the relay connector apparatus 100 according to the first embodiment. FIG. 5 is an enlarged view showing an example of a part of the spring component 130 for shell connection in the relay connector apparatus 100 according to the first embodiment. As shown in FIGS. 4 and 5, the spring component 130 for shell connection has a body part 140, a spring piece 150, and a spring piece 160.

The body part 140 includes a plate-shaped part 141, a folding part 142, and a folding part 143. The plate-shaped part 141 is plate-shaped extending in the X-axis direction. The folding part 142 is connected to an end part of the plate-shaped part 141 on the X-axis negative direction side. The folding part 143 is connected to an end part of the plate-shaped part 141 on the X-axis positive direction side. The folding part 142 includes a part 144 extending in the Z-axis negative direction from an end part of the plate-shaped part 141 on the X-axis negative direction side, and a part 145 extending in the X-axis positive direction from an end part of the part 144 on the Z-axis negative direction side. The folding part 143 includes a part 146 extending in the Z-axis negative direction from an end part of the plate-shaped part 141 on the X-axis positive direction side, and a part 147 extending in the X-axis negative direction from an end part of the part 146 on the Z-axis negative direction side. The corners of the folding part 142 and the folding part 143 may appropriately have a slight rounding, such as corners R.

An elongated hole 148 extending in the X-axis direction is formed at the end part of the plate-shaped part 141 on the X-axis negative direction side. An elongated hole 149 extending in the X-axis direction is formed at the end part of the plate-shaped part 141 on the X-axis positive direction side. The spring piece 150 is disposed inside the hole 148, and the spring piece 160 is disposed inside the hole 149.

The spring piece 150 has a seesaw shape including a part extending in a direction obliquely intersecting with the plate surface 123 of the printed circuit board 120. The spring piece 150 has a spring part 151 and a U-shaped part 152. The spring part 151 includes a part extending in a direction obliquely intersecting the plate surface 123. In the spring piece 150, the end part of the spring part 151 on the X-axis negative direction side is positioned on the Z-axis positive direction side relative to the plate-shaped part 141. The end part of the spring part 151 on the X-axis positive direction side may be positioned on the Z-axis negative direction side relative to the plate-shaped part 141, or may be at the same height as the plate-shaped part 141.

In the spring piece 150, the U-shaped part 152 is connected to the end part of the spring part 151 on the X-axis negative direction side. The U-shaped part 152 includes a part 153 extending in the Z-axis negative direction from the end part of the spring part 151 on the X-axis negative direction side, and a part 154 extending in the X-axis positive direction from the end part 153 on the Z-axis negative direction side.

One end of the spring piece 150, i.e., an end part 155 of the spring part 151 on the X-axis positive direction side includes a spring contact point P1. The other end of the spring piece 150, i.e., the part 153 that is the end part of the U-shaped part 152 on the X-axis negative direction side, includes a force point P2 that is pushed by the connector 200 in the fitting direction (denoted as a direction A in the drawing) parallel to the plate surface 123 of the printed circuit board 120. The fitting direction of the connector 200 is the X-axis positive direction. The part between one end and the other end of the spring piece 150 includes a pivot point P3 rotatably fixed to the plate-shaped part 141 of the body part 140. Accordingly, during the fitting operation of the connector 200, the connector 200 pushes the part 153, which is the force point P2, in the fitting direction, so that the end part 155, which is the spring contact point P1, moves in the direction toward the printed circuit board 120 (denoted as a direction B in the drawing).

Specifically, before the connector 200 is fitted, the U-shaped part 152 protrudes from the end surface 111 of the housing 110. When the connector 200 is fitted, the end surface of the hood 240 of the connector 200 on the X-axis positive direction side pushes the U-shaped part 152 in the X-axis positive direction. As a result, the spring part 151 rotates around the pivot point P3, so that the end part 155 of the spring part 151 moves in the Z-axis negative direction toward the printed circuit board 120. Thus, the end part 155, which is the spring contact point P1, is brought into contact with the conductive shell 210 of the connector 200. Here, the part 153 of the spring piece 150 including the force point P2 is bent in the Z-axis direction orthogonal to the X-axis direction, which is the fitting direction. Therefore, when the connector 200 presses the force point P2, the friction with the force point P2 can be reduced, thereby suppressing the generation of wear debris.

The structure of the spring piece 160 is similar to that of the spring piece 150 except that the orientation of each part of the spring piece 150 is reversed in the X-axis direction. Accordingly, the spring component 130 for shell connection has the spring contact point P1 of the spring piece 150 that is pushed by the connector 200 and moves in the direction toward the printed circuit board 120 during the fitting operation of the connector 200. The spring component 130 for shell connection has the spring contact point P1 of the spring piece 160 that is pushed by the connector 300 and moves in the direction toward the printed circuit board 120 during the fitting operation of the connector 300. When the connector 200 is fitted to the housing 110 on the X-axis negative direction side, the spring contact point P1 of the spring piece 150 is brought into contact with the conductive shell 210. When the connector 300 is fitted to the housing 110 on the X-axis positive direction side, the spring contact point P1 of the spring piece 160 is brought into contact with the conductive shell 310. As a result, the conductive shell 210 and the conductive shell 310 become conductive.

The spring component 130 for shell connection may be composed of a single component that is integrally molded by bending processing after being punched out with a press from a metal plate. For example, a metal plate is punched out with a press to form a rectangular shape extending in the X-axis direction. Then, the spring piece 150 and the spring piece 160 are punched by a press near the end parts of the punched metal plate on the X-axis negative direction side and the X-axis positive direction side, respectively. In this manner, the body part 140, the spring piece 150, and the spring piece 160 are formed. The rotatable pivot point P3 is formed between the body part 140 and the spring piece 150 and the spring piece 160.

The folding part 142, the folding part 143, and the U-shaped part 152 are formed by bending processing. In this way, the spring component 130 for shell connection can be integrally molded from one component. As a result, since there is no need to join a plurality of members, machining can be facilitated. The spring component 130 for shell connection may be formed by joining a plurality of members.

Figure 6:
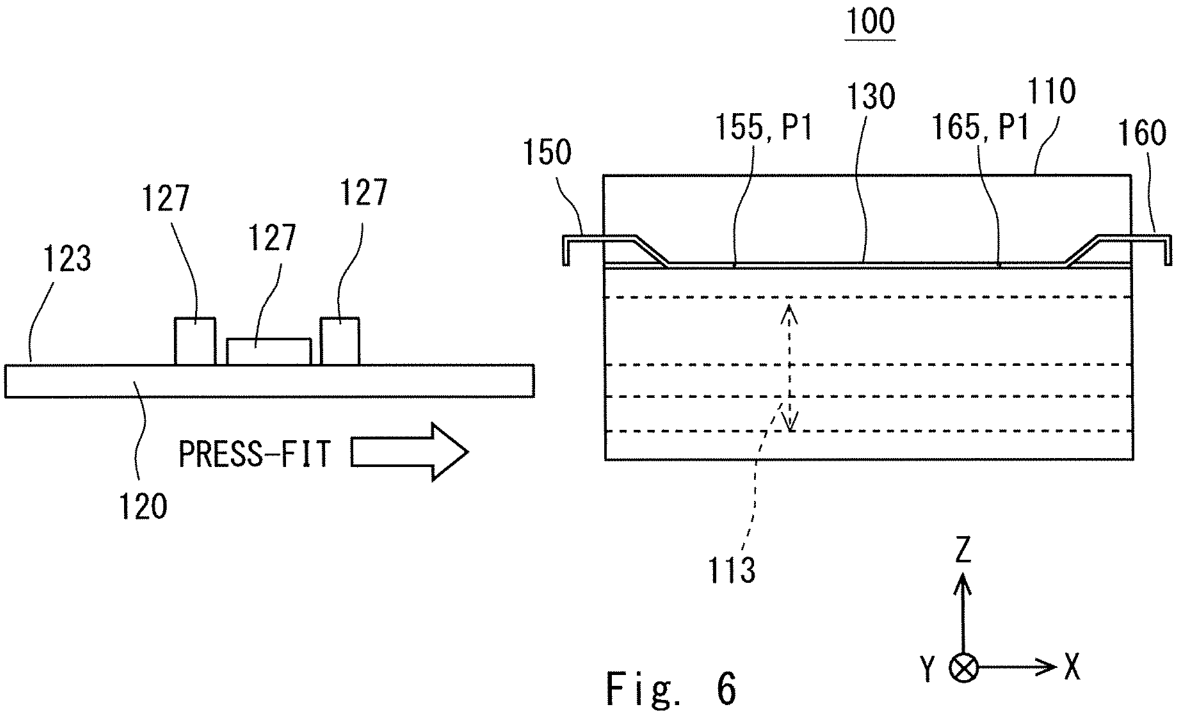
FIG. 6 is a schematic view showing an example of an operation of the relay connector apparatus according to the first embodiment.
Figure 7:
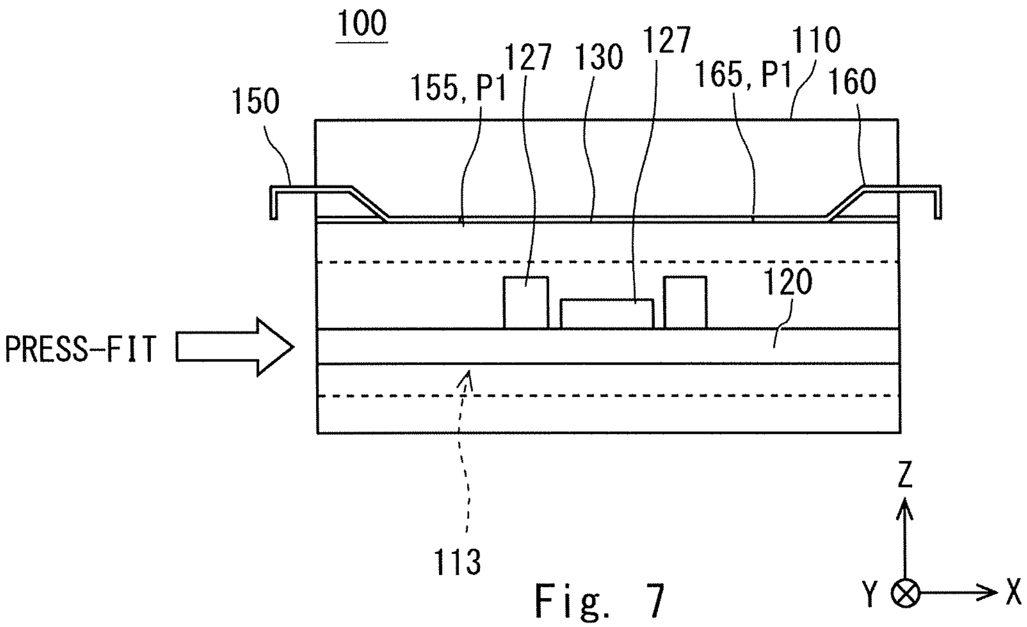
FIG. 7 is a schematic view showing an example of an operation of the relay connector apparatus according to the first embodiment.

Next, an operation of the relay connector apparatus 100 will be described. FIGS. 6 to 9 are schematic diagrams showing an example of the operation of the relay connector apparatus 100 according to the first embodiment. As shown in FIG. 6, the printed circuit board 120 is first included in the housing 110. Specifically, the printed circuit board 120 on which the components 127 are mounted is inserted into the through hole 113 of the housing 110. At this time, the end part 155 serving as the spring contact point P1 of the spring piece 150 and an end part 165 serving as the spring contact point P1 of the spring piece 160 do not move in the Z-axis negative direction. Therefore, as shown in FIG. 7, the printed circuit board 120 can be press-fitted into the housing 110 without causing the spring contact point P1 or the like of the spring component 130 for shell connection to interfere with the components 127.

Figure 8:
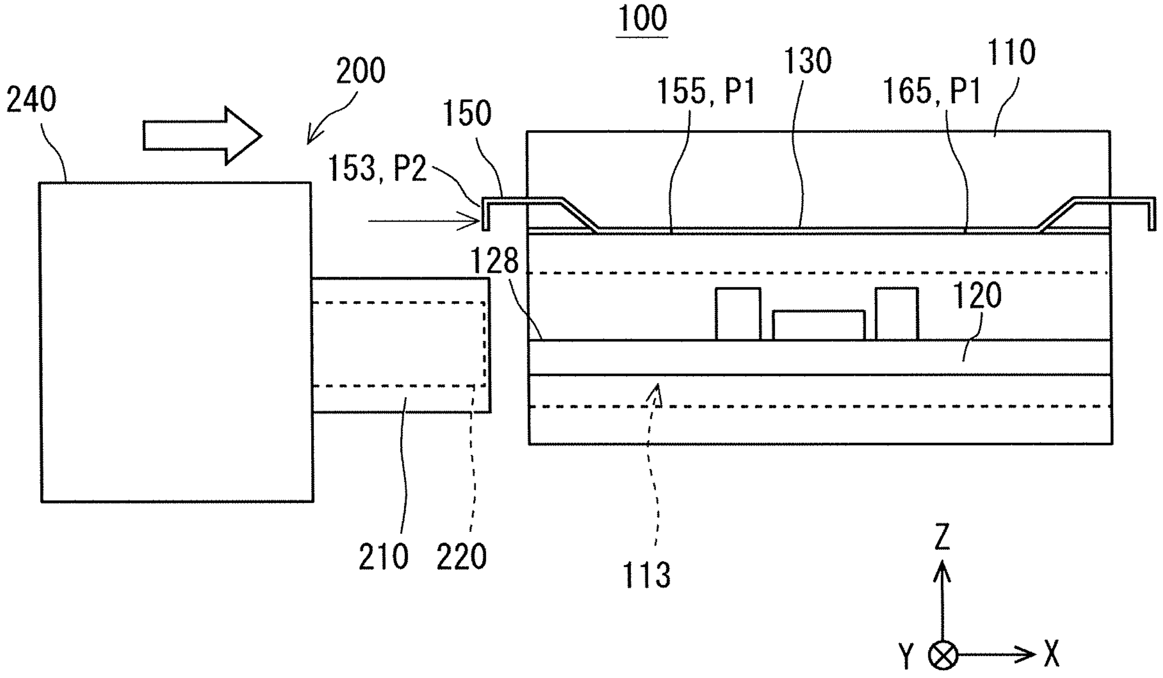
FIG. 8 is a schematic view showing an example of an operation of the relay connector apparatus according to the first embodiment.

Next, as shown in FIG. 8, the connector 200 is fitted to the relay connector apparatus 100. Specifically, the conductive shell 210 of the connector 200 is fitted to the through hole 113 of the relay connector apparatus 100, and the contact points 128 are inserted into the plug 220. The end surface of the hood 240 of the connector 200 in the X-axis positive direction pushes the part 153, which is the force point P2 of the spring piece 150, in the X-axis positive direction, i.e., the fitting direction.

Figure 9:
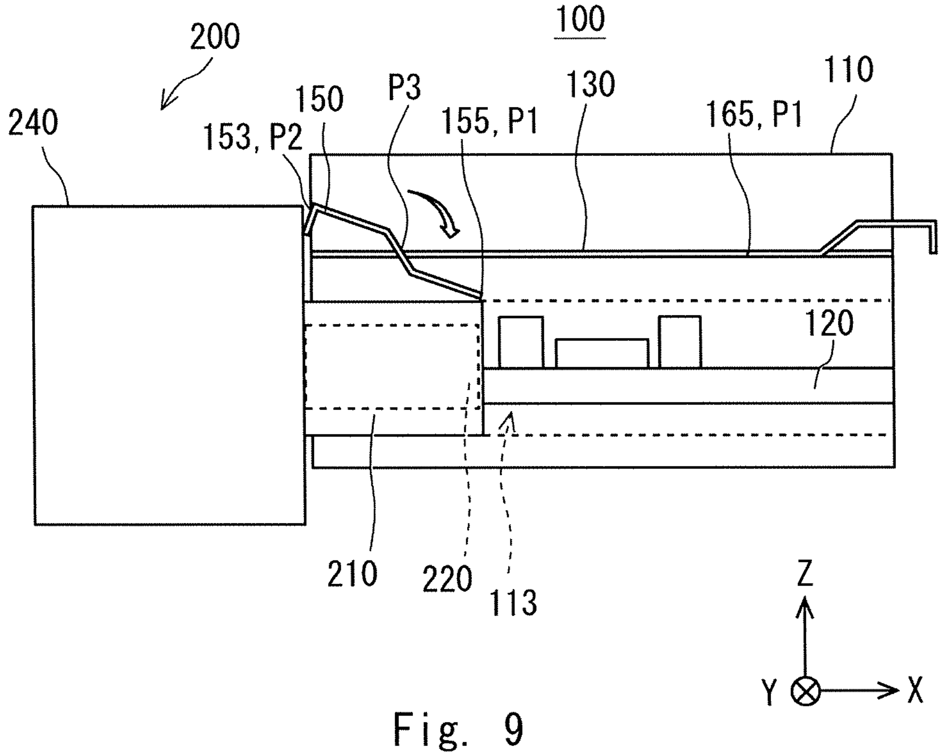
FIG. 9 is a schematic view showing an example of an operation of the relay connector apparatus according to the first embodiment.

Then, as shown in FIG. 9, the spring piece 150 rotates around the pivot point P3. Consequently, the end part 155, which is the spring contact point P1, moves in the Z-axis negative direction, which is the direction toward the printed circuit board 120. Thus, the spring contact point P1 is brought into contact with the conductive shell 210. The contact points 128 of the printed circuit board 120 are brought into contact with the plug 220 disposed inside the conductive shell 210. In this way, the connector 200 can be fitted to the relay connector apparatus 100. The process of fitting the connector 300 to the relay connector apparatus 100 is the same as the process of fitting the connector 200 to the relay connector apparatus 100, except that the connector 300 is in the reverse direction in the X-axis direction.

Next, the effects of this embodiment will be described. The relay connector apparatus 100 according to this embodiment includes the contact points 128 directly inserted into the connector 200 at least at one end part of the printed circuit board 120. Therefore, at least one connector part as described in Japanese Unexamined Patent Application Publication No. H02-273476 can be eliminated as a component of the relay connector apparatus 100. This suppresses an increase in cost and deterioration of transmission characteristics caused by the connector part.

Further, the contact points 128 directly inserted into the connector 200 and the connector 300 may be provided at both end parts of the printed circuit board 120. Furthermore, the spring contact points P1 moving in the direction toward the printed circuit board 120 may be provided on both sides of the spring component 130 for shell connection. As described above, if both sides of the printed circuit board 120 have the contact points 128 such as edge connectors, it becomes further possible to suppress an increase in cost and deterioration of transmission characteristics.

During the fitting operation of the connector 200, the part 153 serving as the force point P2 to be bought into contact with the connector 200 is bent in a direction substantially orthogonal to the fitting direction. Therefore, by pressing the part serving as the force point P2 without friction, the spring part 151 of the spring piece 150 can be rotated around the pivot point P3. This helps to suppress generation of wear debris.

The end part 155 of the spring piece 150 is pushed by the connector 200 and moves in the direction toward the printed circuit board 120 during the fitting operation of the connector 200. Therefore, the end part 155 of the spring piece 150 is not moved in the Z-axis negative direction before the fitting operation of the connector 200. Thus, interference between the components 127 mounted on the printed circuit board 120 and the spring piece 150 can be suppressed during manufacturing process of placing the printed circuit board 120 in the housing 110.

Like the connectors 1 and 2 in Japanese Unexamined Patent Application Publication No. H02-273476, the connectors 1 and 2 having projecting fitting parts 14 and 25 cannot be connected to each other. Therefore, for example, the relay connector apparatus 5 having recessed connector parts 6 and 7 at both ends is required. When the connector parts 6 and 7 are not used for cost reduction, it may be possible to obtain conduction between signals of the connectors 1 and 2 by directly fitting the connectors 1 and 2 to the printed circuit board 8. However, it is necessary to connect the fitting parts 14 and 25 of the connectors 1 and 2 as GND, but as described above, when the connector parts 6 and 7 are not used to reduce costs, it is necessary to provide a separate GND connection structure. When an IC or a chip component is mounted on the printed circuit board 8, as in the case of the relay connector apparatus 5 described in Japanese Unexamined Patent Application Publication No. H02-273476, the length of the relay connector apparatus 5 in the thickness direction is increased. Therefore, when the GND connection structure is separately provided, the provided GND connection structure is brought into contact with the IC and chip components mounted on the printed circuit board 8 before being brought into contact with the fitting parts 14 and 25 of the connectors 1 and 2, and thus there is a risk of breakage.

In the relay connector apparatus 100 according to this embodiment, when the printed circuit board 120 is pressed in, the end part 155 serving as the spring contact point P1 of the spring component 130 for shell connection is kept away from the components 127 mounted on the printed circuit board 120. Thus, interference between the component 127 and the spring contact point P1 can be suppressed. When the connector 200 is fitted, the spring contact point P1 moves in a direction toward the printed circuit board 120 and is brought into contact with the conductive shell 210. As described above, in the relay connector apparatus 100 according to this embodiment, the contact structure of the GND becomes effective for the first time when the connector 200 is fitted. Therefore, the connection structure of the GND can be obtained while preventing the breakage of the components 127 such as IC and chip components.

Second Embodiment

Next, a relay connector apparatus according to a second embodiment will be described. In the relay connector apparatus according to this embodiment, a spring piece has a cantilever beam structure. FIGS. 10 to 13 are schematic diagrams showing an example of a configuration and an operation of a relay connector apparatus 400 according to the second embodiment. As shown in FIGS. 10 to 13, the relay connector apparatus 400 according to this embodiment includes a spring component 430 for shell connection. The spring component 430 for shell connection includes a body part 440, a spring piece 450, and a spring piece 460.

Figure 10:
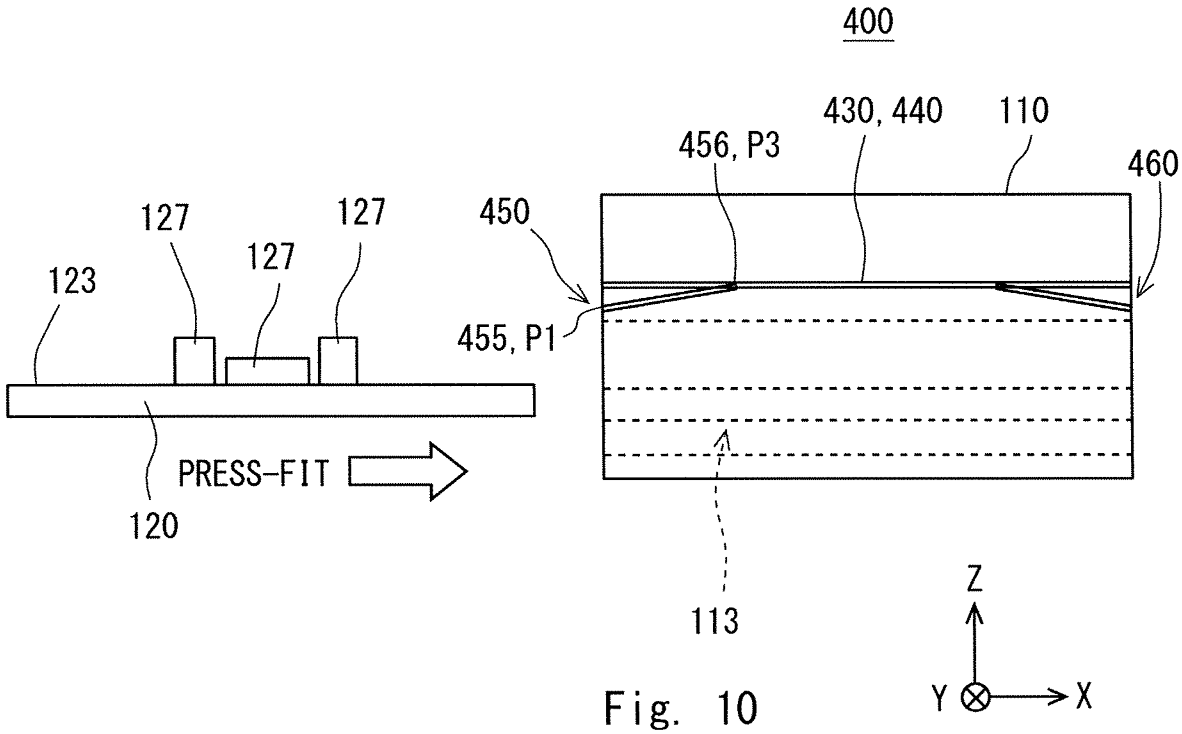
FIG. 10 is a schematic view showing an example of a configuration and operation of a relay connector apparatus according to a second embodiment.

As shown in FIG. 10, the spring piece 450 has a cantilever beam shape including a part extending in a direction obliquely intersecting the plate surface 123 of the printed circuit board 120. One end of the spring piece 450, i.e., an end part 455 of the spring piece 450 on the X-axis negative direction side, includes a spring contact point P1. The other end of the spring piece 450, i.e., an end part 456 of the spring piece 450 on the X-axis positive direction side, includes a pivot point P3 fixed to the body part 440. Therefore, the end part 456 has the same height as that of the body part 440.

Figure 11:
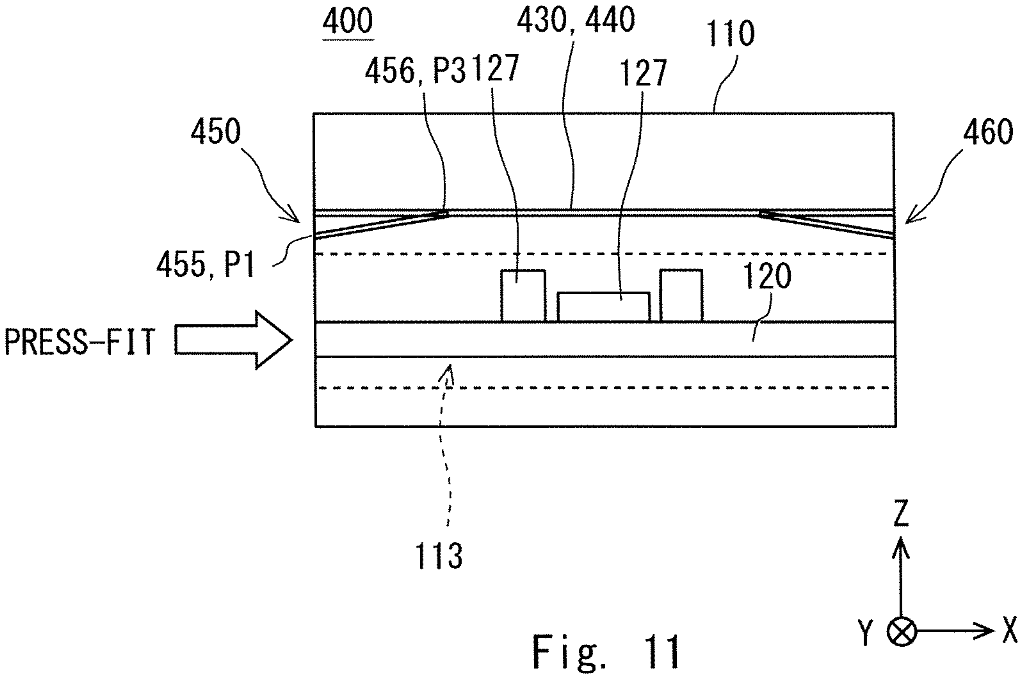
FIG. 11 is a schematic diagram showing an example of the configuration and operation of the relay connector apparatus according to the second embodiment.

The end part 455 of the spring piece 450 is positioned in the Z-axis negative direction relative to the body part 440. By positioning the end part 455 in the Z-axis positive direction relative to the components 127 mounted on the printed circuit board 120, as shown in FIG. 11, the printed circuit board 120 can be disposed inside the housing 110 while suppressing interference between the spring component 430 for shell connection such as the end part 455 and the components 127.

Figure 12:
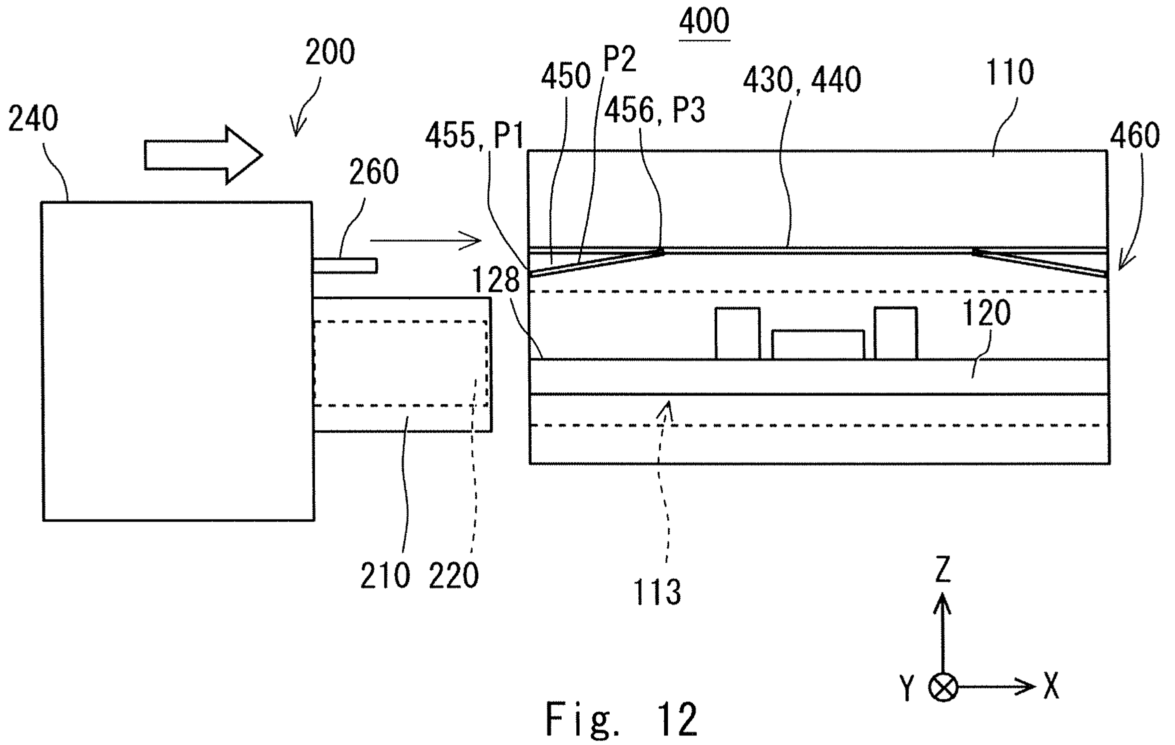
FIG. 12 is a schematic diagram showing an example of the configuration and operation of the relay connector apparatus according to the second embodiment.
Figure 13:
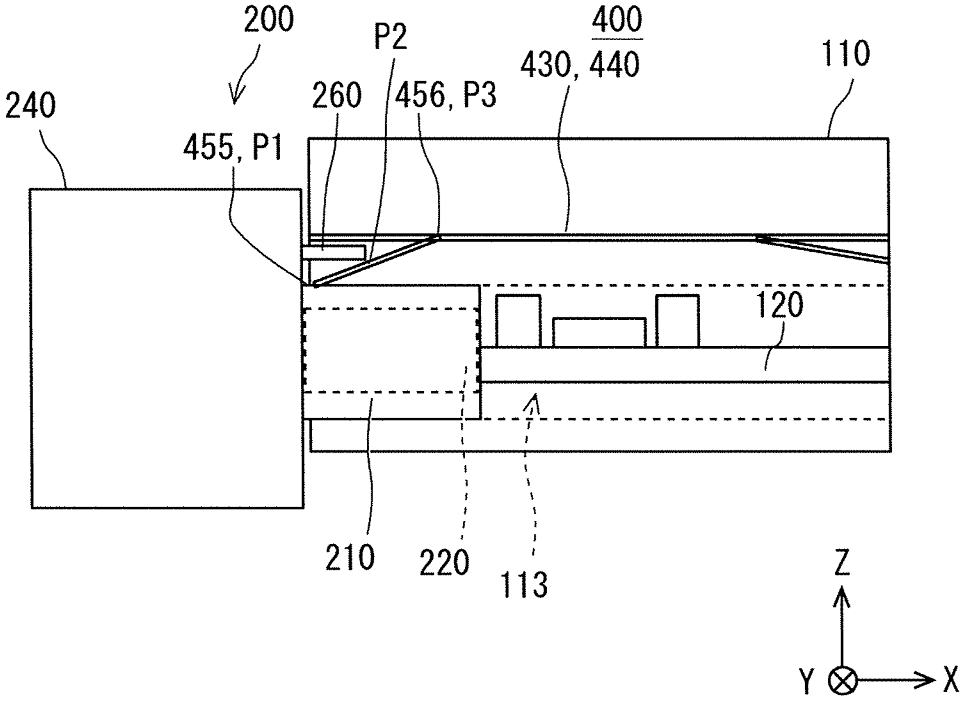
FIG. 13 is a schematic diagram showing an example of the configuration and operation of the relay connector apparatus according to the second embodiment.
Figure 14:
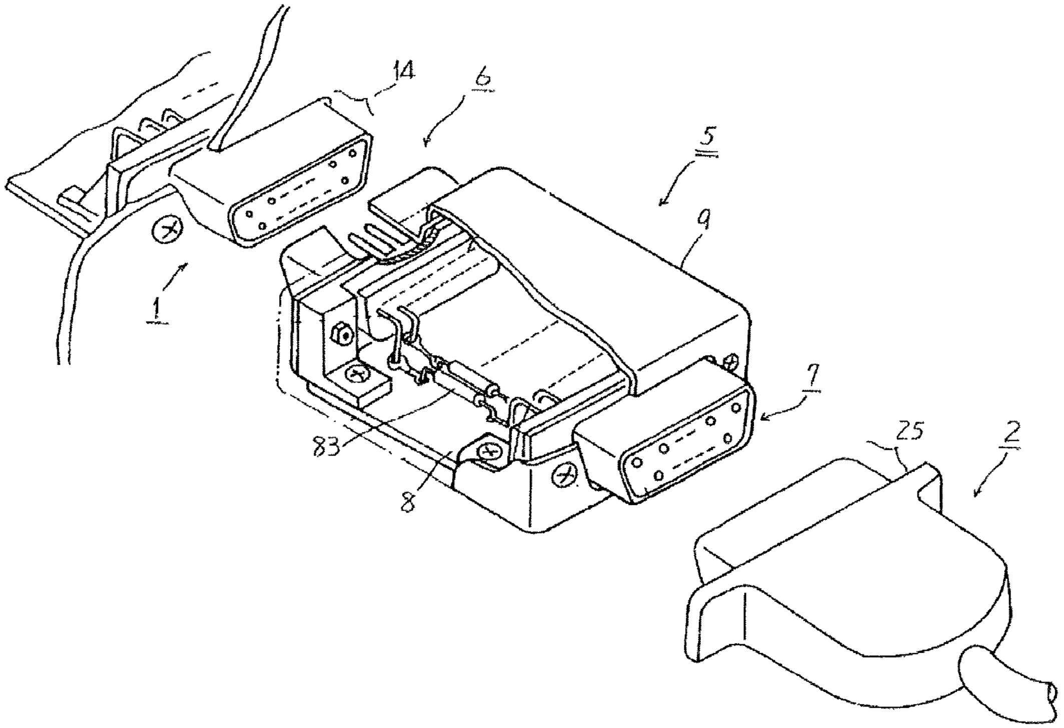
FIG. 14 is a perspective view showing an example of a relay connector apparatus for connecting a connector to a connector.

As shown in FIG. 12, the part between the end part 455, which is one end of the spring piece 450, and the end part 456, which is the other end thereof, includes a force point P2 pushed in the fitting direction parallel to the plate surface 123 of the printed circuit board 120 by the connector 200. The connector 200 includes an insertion part 260 protruding from the end surface of the hood 240 on the X-axis positive direction side. The insertion part 260 is a part inserted into the housing 110. The force point P2 is pushed by the insertion part 260 of the connector 200. Therefore, as shown in FIG. 13, the connector 200 pushes the force point P2 in the fitting direction during the fitting operation of the connector 200, so that the end part 455, which is the spring contact point P1, moves in the direction toward the printed circuit board 120. As a result, the end part 455, which is the spring contact point P1, can be brought into contact with the conductive shell 210.

The structure and operation of the spring piece 460 are similar to those of the spring piece 450, except that the orientation of each part of the spring piece 450 is reversed in the X-axis direction.

According to this embodiment, the relay connector apparatus 400 has the spring piece 450 and the spring piece 460 having a cantilever beam structure. During the fitting operation of the connector 200, the insertion part 260 inserted into the housing 110 pushes the force point P2 between the end part 455 and the end part 456, so that the end part 455, which is the spring contact point P1, moves in the direction toward the printed circuit board 120. As a result, the spring contact point P1 is brought into contact with the conductive shell 210. Since the insertion part 260 of the connector 200 pushes the force point P2 obliquely, the connector part can be eliminated, although there is a concern that wear debris may be generated. This suppresses the increase in cost and deterioration of transmission characteristics caused by the connector part.

Although embodiments of the present disclosure have been described above, the present disclosure includes suitable modifications that do not detract from its purpose and advantages and is not limited by the above embodiments.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A relay connector apparatus comprising:

a housing;

a printed circuit board disposed inside the housing; and a spring component for shell connection disposed inside the housing, wherein a first connector having a first conductive shell is fitted to one side of the housing and a second connector having a second conductive shell is fitted to another side of the housing, at least an end part of the printed circuit board on the one side includes a first contact point to be inserted into the first connector, the spring component for shell connection includes a first spring contact point that is pushed by the first connector and moves in a direction toward the printed circuit board during a fitting operation of the first connector, and when the first connector is fitted to the one side of the housing, the first spring contact point is brought into contact with the first conductive shell, so that the first conductive shell and the second conductive shell become conductive.

2. The relay connector apparatus according to claim 1, wherein the spring component for shell connection comprises:

a cantilever beam type spring piece including a part extending in a direction obliquely intersecting a plate surface of the printed circuit board; and a body part, wherein one end of the spring piece includes a first spring contact point, another end of the spring piece includes a pivot point fixed to the body part, a part between the one end and the other end includes a force point pushed by the first connector in a fitting direction parallel to the plate surface, and during the fitting operation of the first connector, the first connector pushes the force point, so that the first spring contact point moves in a direction toward the printed circuit board.

3. The relay connector apparatus according to claim 1, wherein the spring component for shell connection comprises:

a seesaw type spring piece including a part extending in a direction obliquely intersecting a plate surface of the printed circuit board; and a body part, wherein one end of the spring piece includes a first spring contact point, another end of the spring piece includes a force point pushed by the first connector in a fitting direction parallel to the plate surface, a part between the one end and the other end includes a pivot point fixed to the body part, and during the fitting operation of the first connector, the first connector pushes the force point, so that the first spring contact point moves in a direction toward the printed circuit board.

4. The relay connector apparatus according to claim 3, wherein the part of the spring piece including the force point is bent in a direction orthogonal to the fitting direction.

5. The relay connector apparatus according to claim 1, wherein the spring component for shell connection is integrally formed by bending a metal plate.

6. The relay connector apparatus according to claim 1, wherein the printed circuit board included in the housing has components mounted thereon.

7. The relay connector apparatus according to claim 1, wherein an end part of the printed circuit board has a second contact point to be inserted into the second connector, the spring component for shell connection has a second spring contact point pushed by the second connector and moves in a direction toward the printed circuit board during the fitting operation of the second connector, and when the second connector is fitted to the other side of the housing, the second spring contact point is brought into contact with the second conductive shell, so that the first conductive shell and the second conductive shell become conductive.

8. The relay connector apparatus according to claim 1, wherein the first connector comprises:

the cylindrical first conductive shell protruding from an end surface of a hood to which a harness is connected; and the plug disposed inside the first conductive shell, into which the first contact point is inserted, and the first conductive shell and the second conductive shell are made of metal.

* * * * *